United States Patent [19]

Sokol et al.

[11] 4,198,445
[45] Apr. 15, 1980

[54] LATENT IMAGE PRINTING AND DEVELOPMENT

[75] Inventors: Phillip E. Sokol, Rockville; Robert F. Farmer, Gaithersburg, both of Md.

[73] Assignee: The Gillette Company, Boston, Mass.

[21] Appl. No.: 735,634

[22] Filed: Oct. 26, 1976

Related U.S. Application Data

[62] Division of Ser. No. 616,197, Sep. 24, 1975.

[51] Int. Cl.² .............................................. B32D 35/00
[52] U.S. Cl. .................................. 427/140; 427/145; 427/261
[58] Field of Search .................... 428/29, 199; 35/9 G; 427/145, 140, 261; 106/21

[56] References Cited

U.S. PATENT DOCUMENTS

| | | | |
|---|---|---|---|
| 456,047 | 7/1891 | Meyer | 427/145 |
| 866,293 | 8/1906 | Meyer | 427/145 |
| 1,553,556 | 9/1925 | Rogers | 106/21 |
| 3,363,336 | 1/1968 | Skinner | 35/36 |
| 3,363,337 | 1/1968 | Skinner | 35/36 |
| 3,363,338 | 1/1968 | Skinner | 35/9 G |
| 3,451,143 | 6/1969 | Thomas | 35/48 R |
| 3,508,344 | 4/1970 | Thomas | 35/9 G |
| 3,516,177 | 6/1970 | Skinner | 35/9 G |

FOREIGN PATENT DOCUMENTS

1956143 7/1970 Fed. Rep. of Germany.
713025 10/1931 France.

OTHER PUBLICATIONS

Milton Lesser, "Invisible or Sympathetic Inks", *American Ink Maker*, 11-45, pp. 27-30.

*Primary Examiner*—Bernard D. Pianalto
*Attorney, Agent, or Firm*—Richard A. Wise; Leonard J. Janowski

[57] ABSTRACT

This invention relates to materials and methods used in informational, testing, educational, amusement and other paper-based feedback systems embodying invisible images comprising a color-forming reactant material which can be rendered temporarily visible by the application of a coreactant. The systems may also include visible printed images and are suitable for multiple reuse.

5 Claims, No Drawings

LATENT IMAGE PRINTING AND DEVELOPMENT

This is a division of application Ser. No. 616,197 filed Sept. 24, 1975.

BACKGROUND OF THE INVENTION

Recent commercial applications in the art of latent image printing and development have related primarily to teaching aids and self-instructional material in which, for example, a printed question or problem is presented along with a multiple choice of answers, only one of which is correct. Associated with one or more of the answers is an invisibly printed indication of its correctness, adapted to show a color change when contacted with a marking instrument containing a chemical component adapted to react with the invisible ink. These and other applications of latent image printing and development are disclosed in U.S. Pat. Nos. 3,363,336; 3,363,337; 3,363,338; 3,451,143; and 3,516,177.

A wide variety of invisible but color producing systems have been proposed for such uses. The oldest known invisible inks are those responding to heat. Such inks are invisible when applied to a paper substrate but upon application of heat become visible. Examples described in the literature include solutions of ferric sulfate plus phosphoric acid, cobalt chloride, alloxanthine plus oxalic acid, and potassium nitrate. The use of onion and lemon juices as heat sensitive, invisible inks is also disclosed in the prior art.

Another type of invisible ink, the light sensitive ink, has usually been based on dilute solutions of silver salts such as silver nitrate, although other metal salts such as gold trichloride have been used. The use of oxalomolybdic acid has also been reported. Light sensitive inks appear to have found little commercial utilization as invisible inks and no method of adapting such systems to paper-based applications is apparent.

Another class of invisible inks includes those developed by contact with water and consisting of a waterproof, transparent and colorless substance which is applied to a colored or tinted paper substrate. When the substrate is immersed or dampened with water, the area surrounding the inks changes color and the writing becomes visible. On drying, the system reverts back to its original invisible state. Ink systems which may be used include wax solutions, various gums, metallic soaps and other similar, water insoluble substances. While such systems have found wide usage in advertising, a major limitation of such systems is the dependence on the speed of solvent evaporation for reversion to the invisible state.

A relatively new type of invisible ink is one which gives off a bright fluorescence under the influence of ultraviolet light. Many materials are reported which show such fluorescence but most are unsuitable for use in invisible ink systems due to color or solubility problems. Compounds which have been used in fluorescent invisible inks systems include quinine sulfate, esculin, anthracene, and alpha-phenyl-m-aminobenzothiazole hydrochloride.

The class of invisible inks which appears to be best suited to practical commercial application comprises chemically activated inks based on the reaction of two relatively colorless materials to form a colored compound. A wide variety of such chemical systems is disclosed in the prior art and reference may be made to, inter alia, U.S. Pat. Nos. 3,363,336 and 3,438,927 and German Published Patent Application Ser. No. 1,956,143. To be economically suitable for commercial applications, chemically activated invisible ink systems must be nontoxic and safe for use by children, printable using existing printing equipment, provide a vivid color reaction, and should be reusable several times with the paper substrate quickly reverting back to its original state after each use. We have found that invisible inks based upon phenolphthalein, printed on types of paper as defined herein and developed with certain dilute alkaline compositions fulfill the requirements given above.

We are aware that phenolphthalein-alkaline developer systems have long been disclosed in the prior art in, for example, U.S. Pat. Nos. 456,047 and 866,293 and in German Published Patent Application Ser. No. 1,956,143. To date, however, the art has apparently not developed such a system capable of repeatedly being rendered visible with the developed color automatically fading each time within a controllably predetermined period of time.

DETAILED DESCRIPTION OF THE INVENTION

We have discovered that alkali developable, paper-based systems printed with invisible phenolphthalein inks can be made reusable through many development cycles if certain critical concentrations of dye reactants are employed in conjunction with a paper having a specified water soluble acidity-alkalinity as more fully defined hereafter. By proper choice of parameters, we have found it possible to produce invisibly printed systems which upon development will exhibit a visible mark for only a fraction of a second or for several days before fading. At one extreme, very short development periods are desirable in novelty items where a single item is designed for multiple use by several members in a group. At the other extreme, a period of visible development of several days would be desirable in educational testing materials where the developed answers are to be reviewed or evaluated by a teacher several days after an examination is administered.

There are four main factors that control the color fading time of the phenolphthalein printed, paper-based systems of this invention: (1) the concentration of the phenolphthalein in the invisible ink composition used to print on the paper substrate, (2) the type and concentration of the alkaline reactant solution used to develop the red phenolphthalein color, (3) the water soluble acidity-alkalinity of the paper substrate, and (4) the number of development cycles to which the printed paper has previously been subjected.

We have found that when the phenolphthalein ink comprises a simple solution of phenolphthalein in ethanol, a phenolphthalein concentration range of 0.1 to 9.0 percent by weight will provide color fading times ranging from one second to over forty-eight hours depending upon the characteristics of the developing composition and paper chosen. Such inks are suitable for packaging in conventional porous tipped pens or felt tipped marking devices and may be employed in printing with conventional flexographic printing equipment. Phenolphthalein inks may also be printed using conventional dry offset or letter press equipment. However, when such processes are used, it is necessary to formulate a thickened water soluble vehicle containing the phenolphthalein and a pigment adapted to mask the visible printing traces due to the vehicle. These techniques are well known to those skilled in the art of printing ink formulation and hence will not be further discussed herein. In the form of either simple alcoholic solutions or formulated inks, we prefer to employ 0.5 to 5.0 percent phenolphthalein by weight.

While from the standpoint of color development alone, any alkaline composition might be used to develop the phenolphthalein-based ink, we have found that many alkalis cause a residual yellow discoloration in the paper substrate thus making them unsuitable for use in systems where multiple development cycles are contemplated. Among the alkaline developing agents found to be useful are aqueous solutions of monoethanolamine, propanolamine, and water soluble carbonate, phosphate, borate, and silicate salts. The developing agents may be applied to the phenolphthalein printed substrate in any convenient manner including spraying, brushing, rolling or by the use of conventional marking instruments in which a wick made of felt or other porous medium is loaded with the developing agent. The preferred developing agents are monoethanolamine and sodium carbonate. We have found that solutions of monoethanolamine ranging in concentration from 0.5 to 2.0% by weight will provide color fading times of from one second to nearly six hours depending upon the phenolphthalein concentration employed and the water soluble acid or alkali content of the paper. In like fashion, we have found that similar concentrations of sodium carbonate will provide color fading times ranging from one second to 48 hours. Should even longer color fading times be desired, it is possible to use concentrations of the alkaline color developing solution up to 5.0%.

A third factor which influences color fading time is the water soluble acidity or alkalinity (hereinafter referred to as "acidity-alkalinity") of the paper substrate employed as determined by ASTM Procedure D548-41. The water soluble acidity-alkalinity of the various paper substrates described in the examples below was determined using this procedure as follows.

Fifteen grams of each paper was ground in a Wiley Mill equipped with #20 screen. A 3–5 gram sample of each paper was weighed out to the nearest milligram and placed into a 500 ml Erlenmeyer flask. The flask was placed into a heated oil bath at 100° C. and 350 ml of water added with stirring. At the end of one hour the flask was removed from the oil bath, and the contents immediately suction filtered through a coarse sintered glass filter. Fifty ml of distilled water was used to wash each flask clear of any remaining paper solution. The total filtrate was then allowed to cool to room temperature. To the room temperature solution was added 1 ml of 0.1% phenolphthalein solution, and the solution was then titrated with either 0.01 N sodium hydroxide or 0.01 N hydrochloric acid as required. Total water soluble acidity-alkalinity content of each 5 gram sample was then calculated as set forth in ASTM Procedure D-548-41.

We have found that a wide variety of commercially available papers including groundwood, book or bulk book grade and regular offset grades of paper may be used in the practice of our invention. While uncoated papers can be used satisfactorily where lowest cost is desirable, coated grades should be used where minimal feathering and gloss is desired. In all cases, however, the paper should not have a water soluble alkalinity, as determined above, greater than 0.05% base (as sodium hydroxide). While it is possible to employ papers having a water soluble acidity as determined above as high as 0.08% acid (as sulfur trioxide), we have found that papers of high acid content tend to exhibit increased yellow discoloration upon repeated color development. For this reason, we prefer to employ papers having a water soluble acidity of no more than 0.06%.

We have indicated above that the repeated application of aqueous alkaline solutions to paper substrates can cause discoloration or yellowing of the paper. While this can be minimized by proper choice of alkaline developing solution and paper acidity, we have found that the number of repeat development cycles possible with any particular combination of paper and developer can be increased by the use of a paper stock having a color carefully chosen to mask any alkaline discoloration produced on the paper. We have found to be useful those papers having a yellowness index, YI, ranging from 20 to 50 as defined in and measured by ASTM Method E313, Indexes of Whiteness and Yellowness of Near-White Opaque Materials. We prefer to use paper substrates having a yellowness index of 20 to 30.

The following nonlimiting examples illustrate the principle and practice of this invention.

EXAMPLE I

The color fading times for a variety of combinations of paper type, phenolphthalein ink concentration and aqueous monoethanolamine developer concentration were determined by marking a sample of each of the papers described below with a commercially available porous point pen loaded with the phenolphthalein ink composition. After drying for 5 minutes, the phenolphthalein mark was then crossed with the monoethanolamine developer solution contained in a commercially available felt tip marking pen. The elapsed time from the application of the second reagent to the time the resulting color completely disappeared is shown below as the fading time. Each result is the average of three determinations.

| COLOR FADING TIMES FOR PHENOLPHTHALEIN-MONOETHANOLAMINE SYSTEMS | | | | | |
|---|---|---|---|---|---|
| | | % Monoethanolamine | | | |
| Paper | % Phenolphthalein | 0.5 | 1.0 | 1.5 | 2.0 |
| Uncoated, bulking book | 1.0 | 12 min | 60 min | 95 min | 110 min |
| grade paper having a | 3.0 | 14 " | 85 " | 135 " | 170 " |
| water soluble alkalinity | 5.0 | 53 " | 165 " | 200 " | 253 " |
| of 0.017% | 7.0 | 57 " | 180 " | 250 " | 290 " |
| | 9.0 | 65 " | 270 " | 320 " | 405 " |
| Uncoated regular offset | 1.0 | 1 sec | 23 sec | 4 min | 20 min |
| grade paper having a water | 3.0 | 4 " | 6.5 min | 45 " | 63 " |
| soluble acidity of 0.02% | 5.0 | 5 " | 25 " | 105 " | 150 " |
| | 7.0 | 6 " | 53 " | 185 " | 450 " |
| | 9.0 | 8 " | 85 " | 200 " | 585 " |

-continued

COLOR FADING TIMES FOR PHENOLPHTHALEIN-MONOETHANOLAMINE SYSTEMS

| Paper | % Phenolphthalein | % Monoethanolamine | | | |
|---|---|---|---|---|---|
| | | 0.5 | 1.0 | 1.5 | 2.0 |
| Uncoated groundwood book grade paper having a water soluble acidity of 0.069% | 1.0 | 0 sec | 3 sec | 7 sec | 15 sec |
| | 3.0 | 1 " | 4 " | 12 " | 30 " |
| | 5.0 | 1 " | 5 " | 15 " | 39 " |
| | 7.0 | 1 " | 6 " | 23 " | 45 " |
| | 9.0 | 2 " | 9 " | 35 " | 58 " |
| Uncoated bulking book grade paper having a water soluble acidity of 0.059% | 1.0 | 1 sec | 9 sec | 27 sec | 1 min |
| | 3.0 | 1 " | 28 " | 4.5 min | 7 " |
| | 5.0 | 4 " | 40 " | 10 " | 16 " |
| | 7.0 | 5 " | 1.5 min | 23 " | 32 " |
| | 9.0 | 5 " | 10 " | 40 " | 58 " |

EXAMPLE II

Following the procedure described in Example I, the color fading times for a variety of combinations of paper type, phenolphthalein ink concontration and aqueous sodium carbonate developer concentration were determined with the following result.

COLOR FADING TIMES FOR PHENOLPHTHALEIN-SODIUM CARBONATE SYSTEMS

| Paper | % Phenolphthalein | % Sodium Carbonate | | | |
|---|---|---|---|---|---|
| | | 0.5 | 1.0 | 1.5 | 2.0 |
| Uncoated, bulking book grade paper having a water soluble alkalinity of 0.017% | 1.0 | 4 sec | 90 min | 11 hr | 19 hr |
| | 3.0 | 5 " | 135" | 16 " | 26 " |
| | 5.0 | 6 " | 3.5 hr | 20 " | 31 " |
| | 7.0 | 8 " | 11" | 25 " | 36 " |
| | 9.0 | 14 " | 19" | 31 " | 48 " |
| Uncoated regular offset grade paper having a water soluble acidity of 0.02% | 1.0 | 2 sec | 37 min | 11 hr | 19 hr |
| | 3.0 | 3 " | 80" | 14 " | 20 " |
| | 5.0 | 4 " | 140" | 17 " | 29 " |
| | 7.0 | 5 " | 10 hr | 21 " | 35 " |
| | 9.0 | 8 " | 16" | 28 " | 44 " |
| Uncoated groundwood book grade paper having a water soluble acidity of 0.069% | 1.0 | 1 sec | 1 sec | 2 sec | 6 hr |
| | 3.0 | 1 " | 2" | 3 " | 7 " |
| | 5.0 | 2 " | 3" | 4 " | 8 " |
| | 7.0 | 3 " | 4" | 5 " | 9 " |
| | 9.0 | 4 " | 5" | 4 hr | 19 " |
| Uncoated, bulking book grade paper having a water soluble acidity of 0.059% | 1.0 | 1 sec | 2 sec | 3 sec | 25 sec |
| | 3.0 | 2 " | 3" | 5 " | 40 " |
| | 5.0 | 3 " | 5" | 6 " | 11 hr |
| | 7.0 | 6 " | 7" | 8 " | 16 hr |
| | 9.0 | 14 " | 23" | 150 min | 22 " |

EXAMPLE III

Using the method described in Examples I and II, the color fading times of systems employing 5% phenolphthalein and 1% monoethanolamine with a variety of paper types were evaluated as a function of the number of times the monoethanolamine developer was applied to the same area of the phenolphthalein printed paper, showing the relationship between changes in fading time and the water soluble acidity-alkalinity of the paper employed.

| Paper | No. of Markovers | Fading Time |
|---|---|---|
| Uncoated, bulking book grade paper having a water soluble alkalinity of 0.07% | 1 | 2.2 hr |
| | 2 | 3.7 " |
| | 3 | 4.8 " |
| | 4 | 5.3 " |
| | 5 | 6.3 " |
| Uncoated regular offset grade having a water soluble acidity of 0.02% | 1 | 1.0 hr |
| | 2 | 2.7 " |
| | 3 | 3.6 " |
| | 4 | 4.7 " |
| | 5 | 5.7 " |
| Uncoated, bulking book grade paper having a water soluble acidity of 0.059% | 1 | 40 sec |
| | 2 | 0.5 hr |
| | 3 | 1.3 " |
| | 4 | 1.9 " |
| | 5 | 2.3 " |
| Uncoated groundwood book grade having a water soluble acidity of 0.069% | 1 | 5 sec |
| | 2 | 45 " |
| | 3 | 150 " |
| | 4 | 0.2 hr |
| | 5 | 0.5 " |

EXAMPLE IV

A conventional crossword puzzle of the type commonly found in newspapers and magazines is printed in black ink on an uncoated regular offset grade paper having a water soluble acidity of 0.02% using flexographic printing equipment. The empty spaces within the crossword puzzle itself are printed solidly with an ink comprising 5% solution of phenolphthalein in ethanol.

The user of the puzzle solves it in the conventional manner except that in the place of the usual pen or pencil, there is employed a porous point pen of the type commercially available but loaded with a 1% aqueous solution of monoethanolamine. Wherever the pen contacts the phenolphthalein printed portions of the puzzle, a corresponding bright pink mark or line is generated. Within one hour after completion of the puzzle, all of the answers which have been marked in have totally faded permitting the puzzle to be used again. Even after the fifth such repeated use, all of the marks generated by contact between the phenolphthalein and monoethanolamine fade within less than six hours.

By varying the choice of paper substrate, the concentration of phenolphthalein ink employed, and the identity and concentration of the alkaline developer, similar crossword puzzles can be produced having color fading times ranging from instantaneous to several days.

EXAMPLE V

A multiple choice examination dealing with questions of American history is printed on uncoated, bulking book grade paper having a water soluble alkalinity of 0.017% employing conventional black printers ink and a two color dry offset printing press. Each of the multiple choice answers is followed by a visibly printed box having dimensions of approximately 1 by 2 centimeters. Printed invisibly within each box using the ink formulation shown below is either the word "right" or "wrong".

| Ingredient | % by Weight |
|---|---|
| phenolphthalein | 0.97 |
| ethanol | 4.85 |
| glycerin | 7.77 |
| white clay pigment | 5.83 |
| blown silica suspending agent | 2.91 |
| triglycerol | 77.67 |

In the instructions for taking the examination, the student is directed to use a felt tipped marking pen containing a 2% aqueous solution of sodium carbonate which is provided with the examination and to make a mark in the single box following the answer which he judges to be correct. The teacher administering the examination may wait more than 8 hours before grading such an examination paper and still see clearly the pink mark generated by the reaction between the sodium carbonate and the phenolphthalein. After approximately 24 hours, however, all of the marks denoting the answers will have completely faded, permitting the examinations to be reused by other students. In using this type of examination, there is of course no need to return the paper to the student after the grades are recorded by the teacher since each student will be aware of the number of his errors at the conclusion of the examination.

When a printed examination of the type described above is printed on an uncoated, bulking book grade paper having a water soluble alkalinity of 0.017% and a yellowness index, YI, (as hereinbefore defined) of 18.0, visible alkaline staining occurs after four markovers with 1.5 to 2.0% monoethanolamine developing solutions. When a similar paper having a yellowness index of 25.2 is employed, the phenolphthalein printed portion can be developed 12 times before visible alkaline staining occurs.

What is claimed is:

1. A method of using a reusable, paper-based feedback system comprising applying an alkaline solution to a paper substrate having a water soluble acidity-alkalinity of from 0.08% acid as sulfur trioxide to 0.05% base as sodium hydroxide, said paper substrate bearing
   a. a visible image and
   b. an invisible image derived from printing on said paper substrate an ink comprising from 0.1 to 9.0% by weight phenolphthalein.

2. A method of using a reusable paper-based feedback system according to claim 1 wherein said alkaline solution comprises a member of the group consisting of monoethanolamine, propanolamine and water soluble carbonate, phosphate, borate, and silicate salts.

3. A method of using a reusable paper-based feedback system according to claim 6 wherein said paper substrate has a yellowness index of 20 to 50.

4. A method of using a reusable paper-based feedback system according to claim 1 wherein said paper substrate has a water soluble acidity of no more than 0.06% and wherein the printed invisible entry is derived from printing on said paper substrate an ink comprising from 0.05 to 5.0% by weight phenolphthalein.

5. A method of using a reusable paper-based feedback system according to claim 1 wherein said paper has a yellowness index of 20 to 30.

* * * * *

UNITED STATES PATENT AND TRADEMARK OFFICE
CERTIFICATE OF CORRECTION

PATENT NO. : 4,198,445
DATED : April 15, 1980
INVENTOR(S) : Phillip E. Sokol and Robert F. Farmer It is certified that error appears in the above-identified patent and that said Letters Patent are hereby corrected as shown below:

Column 8, line 34, change "6" to read -- 1 --.

Column 8, line 41, change "0.05" to read -- 0.5 --.

Signed and Sealed this

Fourteenth Day of April 1981

[SEAL]

*Attest:*

RENE D. TEGTMEYER

*Attesting Officer*     *Acting Commissioner of Patents and Trademarks*